United States Patent [19]

Gresham

[11] Patent Number: 4,633,955
[45] Date of Patent: Jan. 6, 1987

[54] DIGGER FOR ROOT CROPS
[75] Inventor: Tony R. Gresham, Portales, N. Mex.
[73] Assignees: Lenard L. Bigler; Marshall W. Baker, both of Portales, N. Mex.; part interest to each
[21] Appl. No.: 722,715
[22] Filed: Apr. 11, 1985
[51] Int. Cl.$^4$ .............. A01D 29/00; A01D 25/04; B65G 47/24; B65G 47/44
[52] U.S. Cl. .......................... 171/1; 171/6; 171/53; 171/55; 171/62; 198/417
[58] Field of Search .......... 130/30 C, DIG. 7; 56/189, 192; 171/1, 4, 6, 7, 23, 43, 50, 55, 56, 57, 60, 90, 96, 97, 138; 198/403, 404, 416, 417

[56]  References Cited
U.S. PATENT DOCUMENTS

| | | | |
|---|---|---|---|
| 922,084 | 5/1909 | Carroll | 171/6 |
| 1,280,207 | 10/1918 | Glaze | 171/57 |
| 2,249,394 | 7/1941 | Noffsinger | 171/6 X |
| 2,522,644 | 9/1950 | Searcy | 130/30 C |
| 2,747,354 | 5/1956 | Bloser | 171/138 X |
| 3,024,849 | 3/1962 | Gregory | 171/1 X |
| 3,106,250 | 10/1963 | Gregory | 171/6 X |
| 3,380,538 | 4/1968 | Ganteaume | 172/701 |
| 3,538,987 | 11/1964 | Taylor | 172/701 X |
| 3,595,251 | 12/1968 | Tarantola | 198/417 X |
| 3,637,023 | 1/1972 | Wood | 171/1 |
| 3,734,193 | 5/1973 | Molnau et al. | 171/57 |

FOREIGN PATENT DOCUMENTS

| | | | |
|---|---|---|---|
| 76420 | 5/1919 | Austria | 171/57 |
| 897145 | 1/1982 | U.S.S.R. | 171/6 |

Primary Examiner—Robert A. Hafer
Assistant Examiner—Terrence L. B. Brown
Attorney, Agent, or Firm—Wendell Coffee; Montgomery Smith

[57]  ABSTRACT

A digger for root crops, such as peanuts, includes two or more digger units depended from a frame drafted by a tractor. Each digger unit includes a screw conveyor, a guide pair helically wrapped 180° around the screw conveyor, and a hydraulic motor to rotate the screw conveyor. Stem and leaf portions of the plants extending above the bed surface are engaged within and moved rearward by flights of the rotating screw conveyor. The stems slide within the helical guide slot, which lifts the peanuts from the soil, moves them outboard of the conveyor, and inverts the plants above the conveyor. The conveyors are angled to the direction of draft so that the inverted plants are discharged from the slots in a windrow on the center furrow between the dug beds. A roller between the conveyors forms a mound or hill in the center furrow to elevate the windrow above standing water.

15 Claims, 12 Drawing Figures

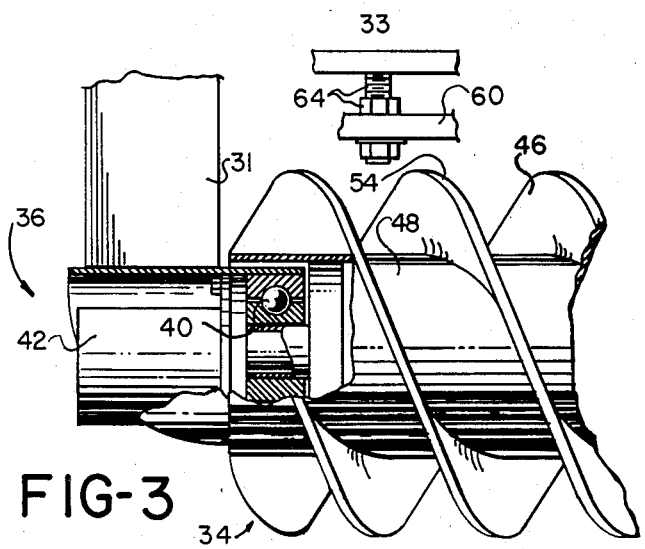
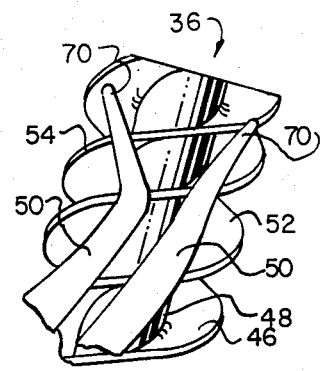
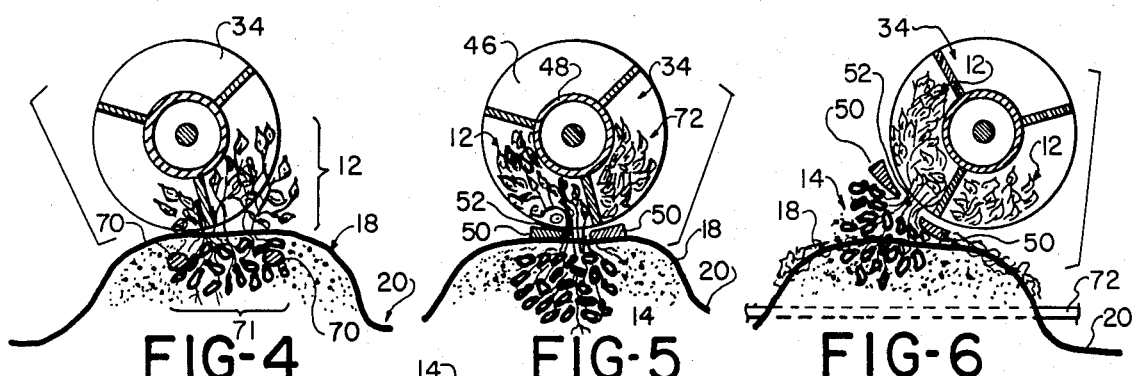
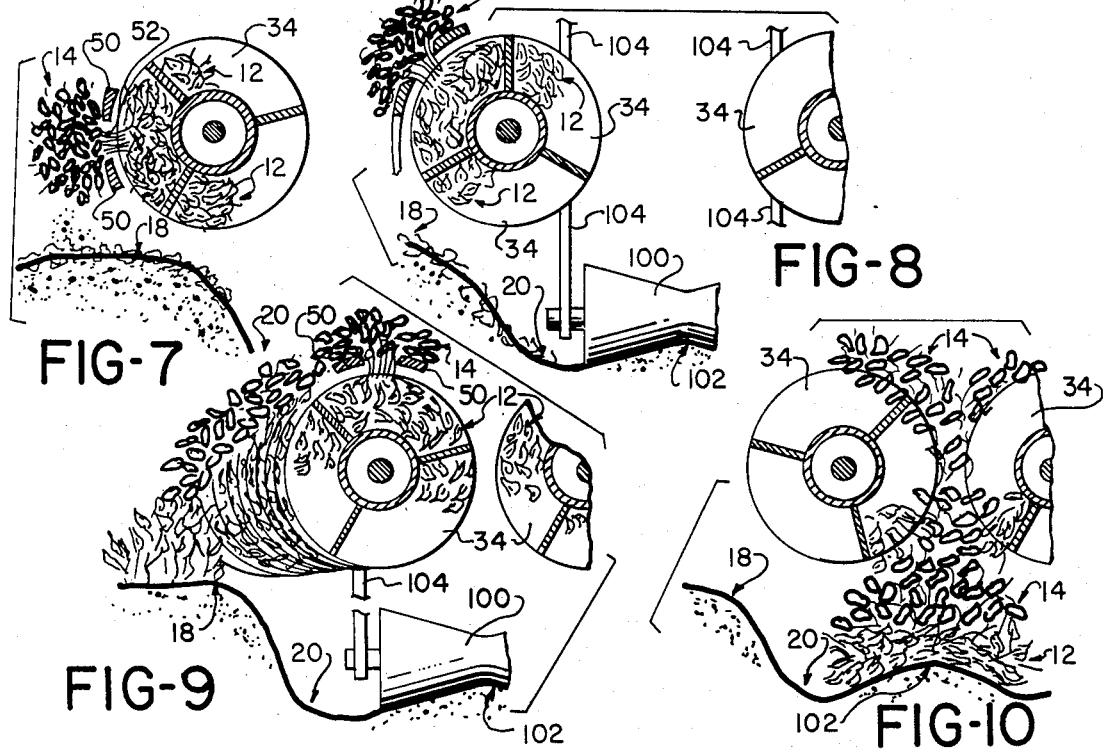

DIGGER FOR ROOT CROPS

CROSS REFERENCE TO RELATED APPLICATIONS

None. However, applicant filed Disclosure Document No. 130,482 on Aug. 31, 1984 which document concerns this application.

BACKGROUND OF THE INVENTION (1) Field of this Invention:

This invention relates to agricultural implements for digging root crops.

(2) Description of the Prior Art

Prior to filing this application, a search was made in the United States Patent and Trademark Office search files, which search developed the following U.S. patent reference Nos.: FANT, 1,288,541; GRINSLADE, 2,054,501; CARELOCK, 2,424,148; HATTON, 2,539,834; FALKNER, 2,669,820; MASON, 2,771,728.

Although the references developed by the search do not appear to be particularly pertinent to my invention, they do show examples of prior art devices. Some prior art devices used prongs (e.g.; "26a", FIGS. 1 and 6, FALKNER; "45", "48", FIGS. 1–4, HATTON), mounted on bars revolving or rotating about axes normal to the direction of draft, to flip or invert the plants. Sweeps (such as "33, FIGS. 1–3, FALKNER and "67", FIGS. 1, 2, HATTON) swept the inverted plants into a windrow.

The device disclosed by MASON apparently catches the stems of the plants between belts "70", "72", and "74", (FIGS. 4, 11; MASON), elevates the plants from the loosened soil (FIGS. 12–14; MASON), and then severs the roots from the plant with cutters "59" (FIGS. 1, 2, 5, 15; MASON).

One problem with prior art diggers is that when it rains after digging, plants are left in standing water in the furrow between dug beds, which accelerates or promotes the growth of undesirable fungi and bacteria. Another problem is that the numerous belts, pulleys, gears and other moving parts of typical prior art devices require constant maintenance, and cause frequent breakdowns.

SUMMARY OF THE INVENTION (1) New Function and Surprising Results

My invention lifts and inverts the plants with a method and structure that is less complicated than that of typical prior art devices. A one row digger unit according to my invention uses an auger or screw conveyor to move the stems of plants within a guide slot. The slot is helically wrapped 180° around the auger or screw conveyor so that the plants are lifted from soil and inverted as they move along the guide slot. The plants are discharged from the slot at the rear end of the auger. When two or more of the diggers are used as a set to dig more than one bed at a time, the augers and guides are preferably angled with respect to the direction of draft so that the inerted plants dug from each bed are deposited in a single windrow.

The ground beneath the peanuts is preferably loosened by a knife or rotating rod weeder drafted beneath the plants within the soil. The rod weeder or knife is preferably positioned behind the leading end of the auger to enable the plant to be firmly engaged within the guides and auger flights before the soil is loosened.

I also prefer to shape the ground in the furrow upon which the inverted plants will be deposited in the shape of a hill or mound, so that water will drain away from the plants in the windrow.

Thus by the use of an auger or screw type conveyor in combination with my helically shaped guides, my invention accomplishes the unexpected results of quickly and easily digging root crops and depositing them in windrows that are elevated above standing water, with an easily drafted and mechanically uncomplicated structure.

Thus it may be seen that the function of the total combination far exceeds the sum of the functions of the individual elements, such as bars, shanks, brackets, rods, etc.

(2) Objects of this Invention

An object of this invention is the digging of root crops.

Another object of this invention is drainage of water from the root crops after digging.

Further objects are to achieve the above with a device that is sturdy, compact, durable, lightweight, simple, safe, efficient, versatile, ecologically compatible, energy conserving, and reliable, yet inexpensive and easy to manufacture, hook up, adjust, operate and maintain.

Other objects are to achieve the above with a method that is versatile, ecologically compatible, energy conserving, rapid, efficient, and inexpensive, and does not require skilled people to hook up, adjust, operate, and maintain.

The specific nature of the invention, as well as other objects, uses, and advantages thereof, will clearly appear from the following description and from the accompanying drawing, the different views of which are not scale drawings.

BRIEF DESCRIPTION OF THE DRAWINGS

FIG. 3 is an elevational view of the forward portion of the auger shown in FIG. 1, with parts broken away to show internal detail.

FIG. 4 is a section view taken substantially along line 4—4 of FIG. 1.

FIG. 5 is a section view taken substantially along line 5—5 of FIG. 1.

FIG. 6 is a section view taken substantially along line 6—6 of FIG. 1.

FIG. 7 is a section view taken substantially along line 7—7 of FIG. 1.

FIG. 8 is a section view taken substantially along line 8—8 of FIG. 1.

FIG. 9 is a section view taken substantially along line 9—9 of FIG. 1.

FIG. 10 is a section view taken substantialy along line 10—10 of FIG. 1.

FIG. 12 is a bottomview of the forks and front end of the digger unit.

DESCRIPTION OF THE PREFERRED EMBODIMENTS

As described above, my invention pertains to an agricultural implement and method for digging root crops. The embodiments described herein are particularly adapted to digging peanuts. Of course, those with ordinary skill in the art dealing with agricultural equipment for digging root crops will be able to utilize the teachings of this application to adapt the specific structure and method described herein to dig other types of root crops.

Figure 1:
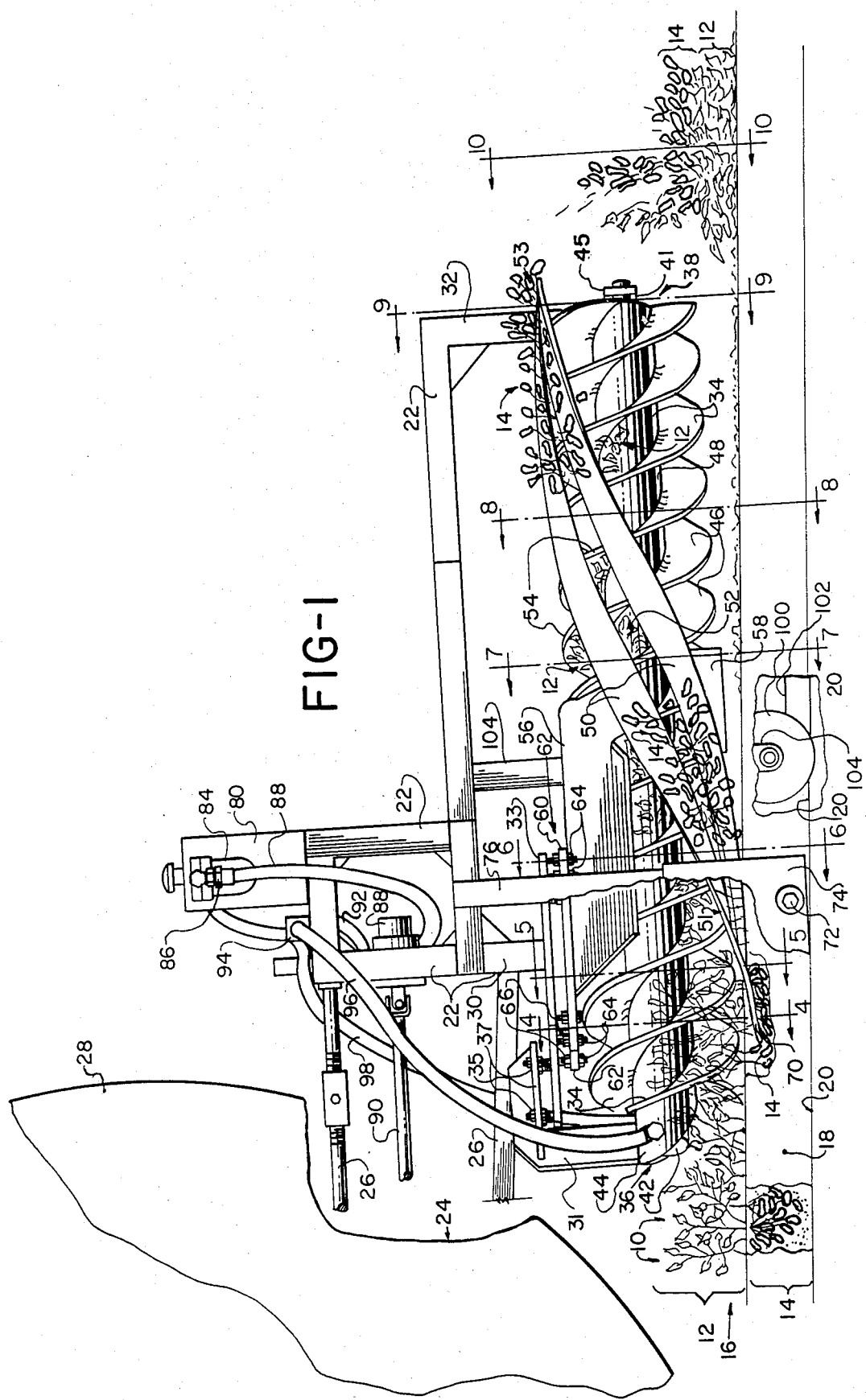
FIG. 1 is a somewhat schematic side elevational view of a two row peanut digger according to my invention, with parts broken away.
Figure 2:
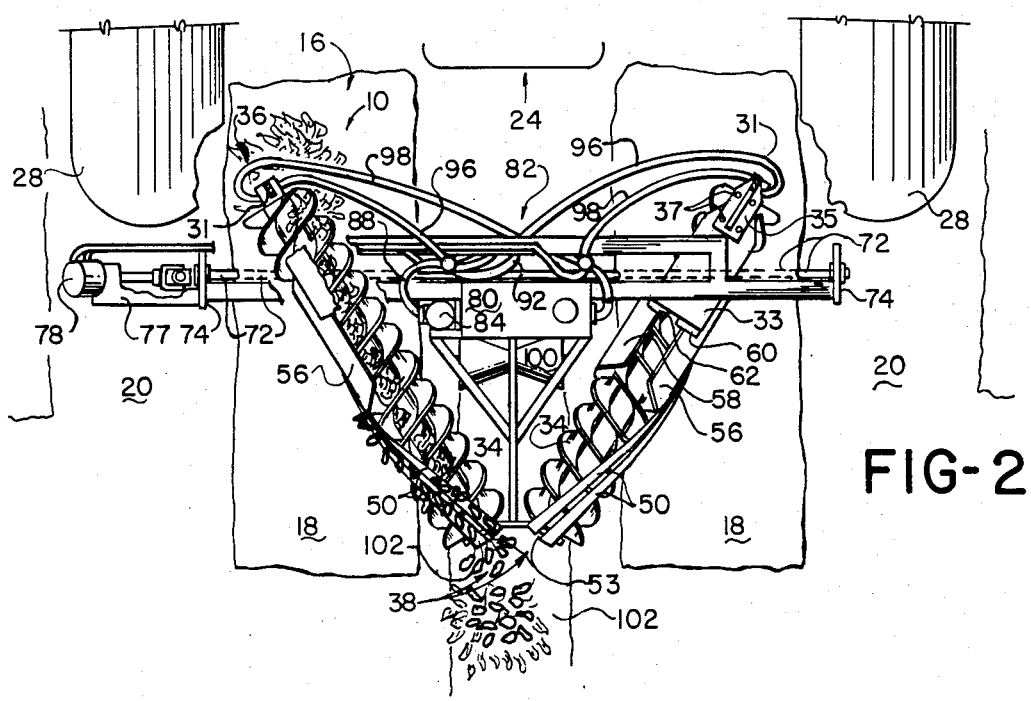
FIG. 2 is a somewhat schematic top plan view of the digger shown in FIG. 1.

Referring to FIGS. 1 and 2, peanut plants 10 are disposed in spaced apart, parallel rows 16 within beds 18, in the form of elevated mounds between furrows 20. The peanut plants 10 have a stem and leaf portion 12 extending above ground, i.e., above the bed surface, and root portion 14, which includes the peanuts, within the ground, i.e., below the bed surface.

Frame 22 of an agricultural implement for digging root crops, in the form of a peanut digger, is preferably drafted behind draft means in the form of tractor 24, for conveying the frame 22 in a direction of draft along the rows 16. The frame 22 is preferably connected to a hydraulically operated three-point hitch 26 of the tractor 24, which provides for supporting, raising and lowering the frame 22. Drive or bull wheels 28 of the tractor 24 are spaced apart so as to roll within the furrows 20 on either side of the beds 18. A centerline of the frame and digger extends in the direction of draft substantially along the furrow 20 between the beds 18. The beds 18 and tractor wheels 28 are outboard of the centerline and the center furrow 20.

Forward shanks 30 depend from a forward portion of the frame 22. Rear shank 32 depends from a rearward portion of the frame 22, preferably centered between the forward shanks with respect to the direction of draft, and above the furrow 20 between the beds 18.

Augers or screw conveyors 34 are journaled at forward ends 36 thereof to auger shanks 31, at housings 44 rigidly attached, preferably by welding, to the auger shanks 31. Bearings 40 provide for free rotation of the screw conveyors 34 with respect to the housings 44. The auger shanks 31 are rigidly connected, preferably by welding, to upper adjustment plates 35. The upper plates 35 are adjustably but rigidly connected to base plate 33 by upper adjustment sets 37. For the preferred embodiment, each upper adjustment set 37 includes four bolts welded to the base plate 35, wtih threaded portions thereof extended through holes in the upper plates 35. Nuts are threaded on to the bolts, with washers, to provide for adjustment of the upper plates 35 (and hence the auger shanks 31, housings 44, and conveyor axes CA) with respect to the base plates 33 (and therefore, the frame 22).

Brackets 45 extend from the rear shank 32 adjacent rear ends 38 of the screw conveyors 34. The screw conveyors 34 are journaled to the rear shank at bearings 41 mounted on the brackets 45. The brackets 45 are preferably adjustably mounted to the rear shank 32 to permit adjustment of the rear ends of the conveyors 34 with respect to the frame 22.

The screw conveyors 34 are rotated about conveyor axes CA, extending through the bearings 40 and 41, by hydraulic motors 42 mounted on the shanks 30 within the housings 44. For compactness of design, and to minimize the extension of digger structure forward of the screw conveyors 34, the housings 44 with the motors 42 and bearings 40 therein, are preferably recessed into the forward ends of the screw conveyors.

Each screw conveyor, and the structure particularly associated therewith, such as, but not limited to the housing motor, bearings, shanks, guide pair, braces, adjustment plates, and guide shanks, forms a digger unit for digging peanuts from a single row. The embodiment shown in FIGS. 1 and 2 is a two unit digger, or two row digger.

The screw conveyors 34 each have helical flights 46 wound around cylinder 48, preferably the triple flight auger form shown in the drawings, although more or less flights, and different spacing could be used as desired. When the screw conveyors 34 are rotated about the axes CA by the motors 42, the flights 46 will rotate about the conveyor axes CA in screw-like auger fashion.

Guides, of guide pairs 50, are spaced apart a width of guide slots 52 therebetween. The guide pairs 50 and the guide slots 52 are helically wound about the conveyor axis CA just outside the flights 46 so that the guide pairs 50 and slots 52 are adjacent flight edges 54. Each guide slot 52 has a mouth end 51 associated with the forward end 36 of its respective screw conveyor 34 and a discharge end 53 associated with the respective rear end 38. The guide pairs 50 and the guide slots 52 of each digger unit are preferably disposed vertically below the conveyor axis CA near the forward conveyor end 36, helically wound 180° rearward along the screw conveyor 34, and disposed vertically above the conveyor axis CA at the rear ends 38, as shown in the drawings.

The guide pairs 50 of each digger unit are preferably connected by braces 56 and 58 to lower adjustment plates 60 and 62, respectively. The lower adjustment plates 60 and 62 are connected by lower adjustment sets 64 and 66, respectively, to the base plate 35, as shown in FIGS. 1 and 3. Each lower adjustment set 64 or 66 preferably includes bolts welded to the base plate 35, and nuts and washers for adjusting the position of the respective lower plates 60 or 62 (and hence the respective guide of the guide pairs 50) with respect to the base plate (and the screw conveyor 34), and with respect to each other to preset the width and shape of the guide slot 52. Thus, the braces 56 and 58, plates 60 and 62, adjustment sets 64 and 66, and base plate 35 rigidly attached to the frame 22, and the screw conveyor 34 combine to form adjustment means for adjusting the spacing of the guide pair 50 to preset the guide slot 52, as well as preset the distance or clearance between the flights edges 54 and the guide pair 50.

Each guide pairs 50 has fork 70 of the guide forwardly extending or disposed at an angle to the direction of draft so that a throat or mouth 71 between the forks of the guide pair is rearwardly tapered from the forward end of the forks to the mouth end of the guide slot (FIG. 12.). Thus the mouth or throat 71 of each guide pair 50 formed by the forks 70 is adapted to sweep or position stems 12 of the peanut plants 10 within the guide slots 52. The forks 70 are preferably spaced slightly behind, or aft, or rearward, of the forward ends 36, as shown in the drawings. The forward ends 36 are preferably positioned slightly outboard of the rows 16 of the plants 10 so that the area between the flights 46 will be exposed more fully to engage the stem and leaf portion 12 before the stems are swept into the mouth ends 51 of the guide slots 52. Consequently, the forks are angled as shown in the drawings to orient the tapered throat properly in the direction of draft.

The discharge ends 53 of the guide slots 52 are preferably slightly rearward or aft of the rear ends 38 so that the inverted plants do not hit the digger structure as they drop to the ground. The plants within the guide slot 52 will push the plants out the discharge end 53 over the short length of the slot 52 extending past the screw conveyor 34.

I prefer to use a soil engaging member in the form of rotating rod weeder 72 as shown in FIGS. 1 and 2, or a stationary knife (not shown), connected to the frame 22, in position to be drafted within the beds 18 beneath the root portions 14, to loosen the soil in the beds 18 and facilitate the elevation and removal of the peanuts 10 from the bed 18 as the stems are moved within the guide slots 52. The rod weeder 72 is preferably journaled to rod shanks 76 rigidly depended from the frame 22 at rod brackets 74 (FIGS. 1 and 2), and rotated by hydraulic rod motor 78 connected to one of the rod shanks 76 by motor holder 77 (FIG. 2). Although not shown, the knife would be rigidly connected to the frame 22 by and between the rod shanks 76, in substantially the same position as the rod 72, and without the motor 78.

Although the preferred hydraulic system is partially shown in FIG. 1, those with ordinary skill will be able to devise the hydraulic systems to power the hydraulic motors 42 and 78. The preferred system, however, includes reservoir 80 securely mounted atop the frame 22, and connected to hydraulic pump 82 through filter 84 and connector 86 by supply line 88.

The pump 82 is operatively connectable by a shaft 90 to the power takeoff (PTO) of the tractor 24, so that as the PTO rotates, the shaft 90 will rotate the shaft of the pump 82. Therefore, the pump 82 is attached to the frame 22 in convenient position for connection to the tractor PTO.

The outlet of the pump 82 is preferably connected by outlet line 92 to proportioning valve 94, and therefore by motor lines 96 to the motors 42 and 78. Return lines 98 connect the hydraulic outlets of the motors to a connector (not shown), which is connected to the reservoir 80. Weeder lines 99 hydraulically connect the motor 78 like lines 96 and 98 do the motors 42. Thus, when it is desired to start or stop rotation of the screw conveyors 34 and rod weeder 72, the operator of the tractor simply engages or disengages the PTO to start or stop the hydraulic pump.

I prefer to use a helical spiral shape for the guide slots 52 that wraps toward the outboard side of the screw conveyor from the forward ends 36. Because of the angled orientation of the screw conveyors and conveyor axes CA, the guide slots 52 of this preferred orientation will initially extend along the direction of draft above the rows 16 such that lateral movement of the peanut plant within the soil from side to side is minimized as the stems move within the guide slots 52, thereby avoiding loosening of peanuts from the plant stems, and facilitating the gathering of as much crop as possible. As the plant is elevated or lifted from the soil, by the helical path of the guide slots as the guide slot helically wraps outboard of the conveyor flights 46, the loosened soil tends to fall away, so that the roots and peanuts are substantially free of the soil, and are then carried inboard and inverted within the guide slots 52.

My invention provides drainage of water from the windrow of dug plants 10, between dug beds 18, by including earth shaping means in the form of roller 100 that forms a mound or hill 102 within the center furrow 20. Referring to FIGS. 1, 2, and 6, the roller 100 is in the shape of two coaxial, opposed cones, with their smaller ends placed together so that when rolled along the furrow 20, soil already in the furrow, and deposited therein after being loosened by the rod weeder 72 or knife (not shown), will be reformed into the dome, round, elevation or slight hill 102 within the center furrow 20. The roller 100 is connected to the frame 22 by roller struts 104 between which the roller 100 is journaled. The roller struts 104 are preferably height adjustable. Thus, when the inverted plants are dropped into the furrow 20 as a windrow, they will rest on the hill 102, and be kept above standing water, which will tend to collect within the center furrow 20, on either side of the hill 102.

FIGS. 4 through 10 sequentially show the operation of the digger shown in FIGS. 1, 2, and 3, and described above. Although only the left digger unit of the digger device is shown in FIGS. 4–7, and only part of the right unit is shown in FIGS. 8–10, the position and operation of the right digger unit would be mirrored across the centerline of the digger. Additionally, some structural details are omitted in FIGS. 4–10 for the sake of clarity.

The flights 46 of the screw conveyor 34 first engage the stem and leaf portion 12 of the plants 10, and the forks 70 ride along or just within the top of the bed 18 (FIG. 4) sweeping the stems of the plants 10 at the bed surface at the mouth end of the slot 52 within the guide pair 50 and slot 52 (FIG. 5). As the screw conveyors 34 rotate, the flights 46 will screwably or threadably move the plants within the guide slots 52, while the frame 22, and the attached digger structure are drafted in the direction of draft.

The speed of draft is preferably close to that at which the plants move within the guide slot 52. Thus, as the screw conveyor 34 moves the plants within the guide slot 52, the root portion 14 of the plants remain substantially stationary within the beds 18 until the helical shape of the guide slot 52 causes continued movement along the slot 52 to lift the plants from the beds 18 (FIG. 6). Stated otherwise the roots are initially lifted from the ground without substantial horizontal movement. The rod weeder 72 is preferably positioned along the direction of draft at or near the point at which the guide slots begin to pull upward on the root portion of the plants. In this way, by placing the rod weeder aft or rearward of the mouth or throat of the slots 52, the stems are firmly engaged within the slots 52 and the leaf portions engaged by the flights 46 before the soil in the bed is loosened (FIG. 6).

As the conveyors 34 continue to move the plants along the guide slots 52, the plants will be inverted from below the conveyor 34 to above the conveyor (FIGS. 7—7). The roller 100 between of the rod weeder and the rear ends 38 preferably forms the hill or mound 102 as the peanut plants are moved toward the rear and above the screw conveyor. When discharged from the guide slots 52 at the rear ends 38, the plants 10 will be fully inverted (FIGS. 9 and 10), and the mound or hill 102 fully formed.

When discharged from the guide slots 52 at the rear ends 38, the angled orientation of the screw conveyors and guide slots 52 with respect to the direction of draft causes the inverted peanut plants to form the windrow on the hill 102 within the furrow 20 between the beds 18.

Figure 11:
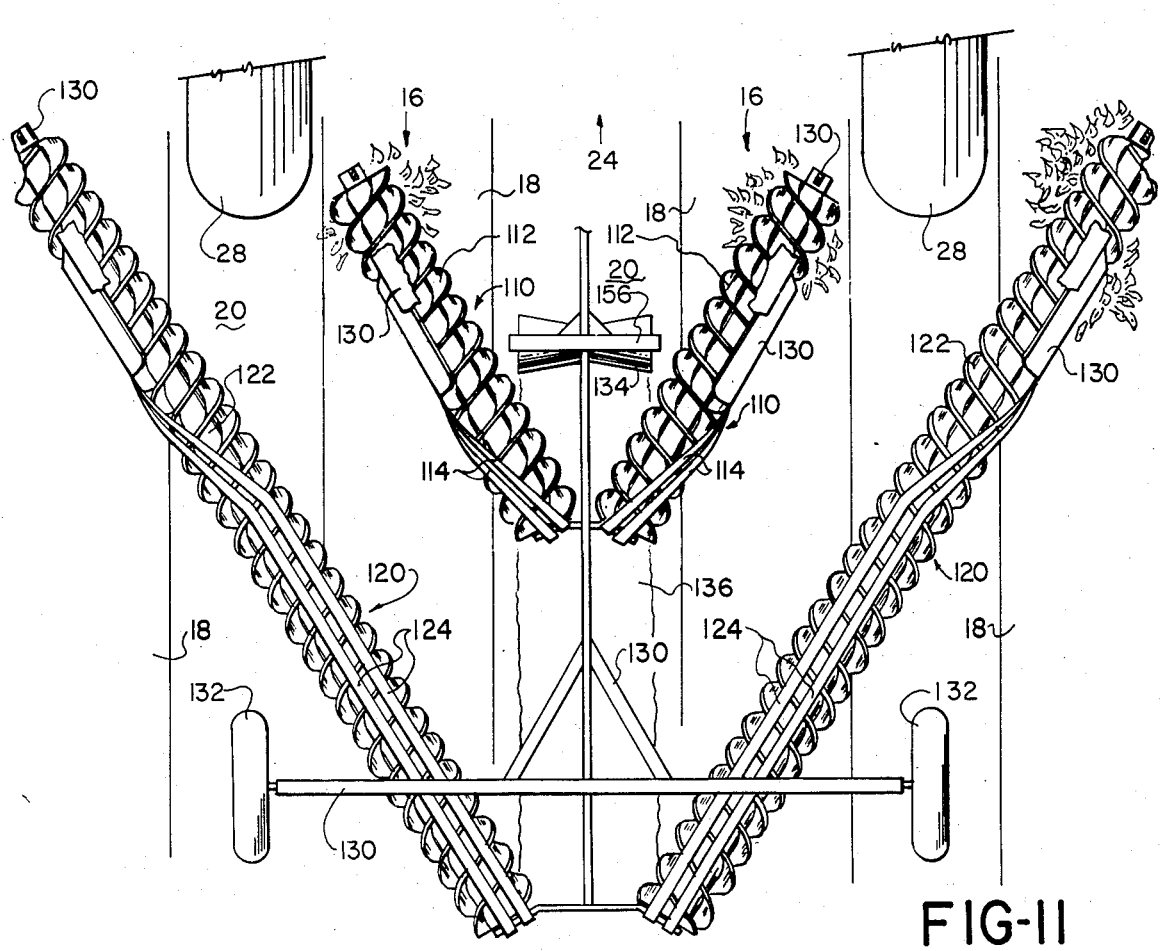
FIG. 11 is a somewhat schematic plan view of a four row digger according to my invention.

FIG. 11 somewhat schematically shows a four row peanut digger embodiment according to my invention, which is structurally and operatively similar to the two row digger unit. Therefore, for details of structure not described herein, the description of the two row embodiment should be consulted. The four row embodiment or digger preferably includes digger units 110 and 120. The digger units 110 include screw conveyors 112 and guide pairs 114 for the inboard digger units 110, and screw conveyors 122 and guide pairs 124 for the outboard digger units 120. The inboard digger units 110 are substantially identical to those described above for screw conveyors 34. The associated structure for connection of the screw conveyors 122 and guide pairs 124 to frame 130 of the four row digger are substantially the same as described above for the screw conveyors 34 and guide pairs 50. The frame 130 would preferably be supported by gauge wheels 132 or the like to accommodate its length and width. The longer outboard units may require stronger members or added intermediate supports between the ends of the conveyors 122.

The forward ends of the screw conveyors 122 are positioned above and aligned with outboard beds 18, outside the beds 18 adjacent the center furrow 20. The rear ends of the screw conveyors 122 are preferably positioned above the center furrow 20 in which an outboard windrow is formed by the digger units 120, slightly outboard of an inboard windrow formed by the inboard digger units 110.

The guide pairs 124 are substantially identical to the guide pairs 50, and the guide pairs 114 of the inboard digger units, from their mouth ends until the guide pairs 124 helically wrap vertically above the conveyors 122. The helical orientation of the guide pairs 124 preferably extends over about the same screw conveyor length as for the guide pairs 50 and 114. From the position vertically above the conveyors 122 axes, the guides 124 curve divert from a helical wrap or shape to extend axially of the screw conveyors 122. Once inverted, the plants are carried rearwardly and axially along the guides 124 of the conveyors 122 until they are discharged above the center furrow 20. Roller 134 preferably forms a wider mound or hill 136 than the mound 102 to accomodate the wider windrow made by plants from four rows.

Thus, the root crops for the embodiments shown, namely peanuts, may be easily and conveniently dug, with an uncomplicated structure and method so that the plants are treated gently and placed in a window above standing water in the furrows.

The embodiment shown and described above is only exemplary. I do not claim to have invented all the parts, elements, or steps described. Various modifications can be made in the construction, material, arrangement, and operation, and still be within the scope of my invention.

The limits of the invention and the bounds of the patent protection are measured by and defined in the following claims. The restrictive description and drawing of the specific example above do not point out what an infringement of this patent would be, but are to enable the reader to make and use the invention.

An an aid to correlating the terms of the claims to the exemplary drawing the following catalog of elements is provided:

CATALOG OF ELEMENTS 10 peanut plants
12 stem and leaf portion
14 root section
16 rows
18 beds
20 furrows
22 frame
24 tractor
26 three point hitch
28 wheels
30 forward shanks
31 auger shanks
32 rear shanks
33 base plate
34 screw conveyors
35 upper adjustment plates
36 forward ends
37 upper adjustment sets
38 rear ends
40 bearings
41 bearings
42 motors
44 housings
45 brackets
46 flights
48 cylinder
50 guide pairs
51 mouth ends
52 guide slots
53 discharge ends
54 flight edges
56 braces
58 braces
60 lower adjustment plates
62 lower adjustment plates
64 lower adjustment sets
66 lower adjustment sets
70 forks
71 throat
72 weeder
74 rod brackets
76 rod shanks
77 motor holder
78 rod motor
80 hydraulic reservoir
82 hydraulic pump
84 filter
86 connector
88 supply line
90 PTO shaft
92 outlet line
94 proportioning valve
96 motor lines
98 return lines
99 weeder lines
100 roller
102 mound or hill
104 roller struts
110 inboard digger units
112 screw conveyors
114 guide pairs
120 outboard digger units
122 screw conveyors
124 guide pairs
130 frame
132 gauge wheels
134 roller
136 mound

SUBJECT MATTER CLAIMED FOR PROTECTION

I claim as my invention:

1. An agricultural implement for digging root crops, including
   a. a frame adapted for connection to
   b. draft means for conveying the frame in a direction of shaft along spaced apart, parallel rows of said root crops;
   wherein the improved implement comprises:
   c. a screw conveyor journaled to the frame for rotation about a conveyor axis,
   d. the screw conveyor having a forward end and a rear end,
   e. the screw conveyor having at least one flight helically wrapped around a length thereof,
   f. drive means connected to the frame for rotating the screw conveyor about the conveyor axis,
   g. a guide pair connected to the frame and helically disposed around and adjacent to the screw conveor flights, such that
   h. guides of the guide pair are spaced apart across a guide slot therebetween, with the guide slot having a mouth end associated with the forward end and a discharge end associated with the rear end,
   i. the guide slot wraps helically around at least a portion of the conveyor length,
   j. the mouth end of the guide slot is disposed below the conveyor, and
   k. the discharge end of the guide slot is disposed above the conveyor.

2. The invention as defined in claim 1 including all of the limitations a. through k. with the addition of the following limitations:
   l. forks of the guides being forwardly disposed at angles to the direction of draft so that a throat between the forks is rearwardly tapered to the guide slot.

3. The invention as defined in claim 1 including all of the limitations a. through k. with the addition of the following limitation:
   l. said screw conveyor and the conveyor axis thereof being transverse of the direction of draft, such that when the forward end is positioned along a row of the root crops, the rear end will be disposed away from said row.

4. The invention as defined in claim 1 including all of the limitations a. through k. with the addition of the following limitation:
   l. said screw conveyor and the conveyor axis thereof being transverse of the direction of draft such that the guide slot extends from the mouth end substantially along the direction of draft until the guide slot wraps outboard of the screw conveyor flights.

5. The invention as defined in claim 1 including all of the limitations a. through k. with the addition of the following limitation:
   l. a soil engaging member connected to the frame in position to pass below the root crops and loosen the soil when the frame is conveyed in the direction of draft.

6. The invention as defined in claim 5 including all of the limitations a. through l. with the addition of the following limitations:
   m. said soil engaging member being in the form of a rotating rod journaled to the frame with
   n. the rod rearward of the conveyor front ends.

7. The invention as defined in claim 1 including all of the limitations a. through k. with the addition of the following limitations:
   l. the structure claimed in limitations "c." through "k." above forming a digger unit,
   m. at least two of the digger units connected to the frame, with
   n. the forward ends spaced apart about the width between adjacent, separate rows of the root crops to be dug,
   o. the rear ends of the conveyors of the digger units being adjacent.

8. The invention as defined in claim 7 including all of the limitations a. through o. with the addition of the following limitations:
   p. a ground shaping device connected to the frame, adapted to form a mound of soil along the direction of draft while the frame is conveyed by the draft means,
   q. the ground shaping device disposed forward of and substantially aligned along the directin of draft with the rear ends.

9. The invention as defined in claim 7 including all of the limitations a. through o. with the addition of the following limitation:
   p. forks of the guides being forwardly disposed at angles to the direction of draft so that a throat between the forks is rearwardly tapered to the mouth end of the guide slot.

10. The invention as defined in claim 7 including all of the limitations a. through o. with the addition of the following limitation:
    p. the guide slot of each digger unit being wrapped outboard of the conveyor between the mouth and discharge ends thereof.

11. A process for digging a row of peanut plants comprising the steps of:
    a. conveying a digger unit in a direction of draft,
    b. engaging above ground portions of the plants with helical flights of a screw conveyor of a digger unit,
    c. sliding stems of the plants, at positions on the plants between the above ground portions engaged by the flights and roots thereof, within a guide slot between a pair of guides helically wrapped around the screw conveyor,
    d. rotating the screw conveyor about a conveyor axis, and
    e. moving the above ground portion of the plants engaged with the flights along the conveyor axis,
    f. moving the stems of the plants helically of the conveyor axis within the helical guide slot,
    g. lifting the plant roots from within the soil responsive to the helical movement of the stems within the guide slot, and
    h. inverting the plants with the roots thereof above the conveyor axis responsive to further helical movement of the stems within the guide slot.

12. The invention as defined in claim 11 including all of the limitations a. through h. with the addition of the following limitation:
    i. after engaging the above ground portions with the helical flights, then loosening the soil below the roots with a ground engaging device of the digger unit spaced below the roots of the plants.

13. The invention as defined in claim 11 including all of the limitations a. through h. with the addition of the following limitations:
    i. performing the steps a. through h. above simultaneously along separate, spaced apart rows of the peanut plants, and j. discharging the inverted plants adjacent each other in a windrow between the dug rows.

14. The invention as defined in claim 13 including all of the limitations a. through j. with the addition of the following limitation:

k. shaping the soil between the rows into a mound before discharging the inverted plants from the digger units.

15. The invention as defined in claim 11 including all of the limitations a. through h. with the addition of the following limitation:

i. initially lifting the roots from the ground without substantial horizontal movement.

* * * * *